Jan. 31, 1933.  C. L. VAN INWAGEN, JR  1,895,828
WIRE SPLICING MACHINE
Filed April 14, 1930  7 Sheets-Sheet 1

INVENTOR
C.L. VAN INWAGEN, JR.
BY J. MacDonald
ATTORNEY

Fig. 2

Jan. 31, 1933. C. L. VAN INWAGEN, JR 1,895,828
WIRE SPLICING MACHINE
Filed April 14, 1930 7 Sheets-Sheet 3

INVENTOR
C.L. VAN INWAGEN, JR.
BY J. MacDonald
ATTORNEY

Jan. 31, 1933.   C. L. VAN INWAGEN, JR   1,895,828
WIRE SPLICING MACHINE
Filed April 14, 1930   7 Sheets-Sheet 4

INVENTOR
C. L. Van Inwagen, Jr.
BY J. MacDonald
ATTORNEY

Jan. 31, 1933.   C. L. VAN INWAGEN, JR   1,895,828
WIRE SPLICING MACHINE
Filed April 14, 1930    7 Sheets-Sheet 6

INVENTOR
C.L. VAN INWAGEN, JR.
BY  J. MacDonald
ATTORNEY

Patented Jan. 31, 1933

1,895,828

UNITED STATES PATENT OFFICE

CHARLES L. VAN INWAGEN, JR., OF RUTHERFORD, NEW JERSEY, ASSIGNOR TO BELL TELEPHONE LABORATORIES, INCORPORATED, OF NEW YORK, N. Y., A CORPORATION OF NEW YORK

WIRE SPLICING MACHINE

Application filed April 14, 1930. Serial No. 443,993.

This invention relates to splicing machines, for use in splicing wires in multi-conductor cables and the like.

The object of this invention is to provide a machine of this character which will be convenient to use, reliable in operation, and wherein conductors are connected to each other by a so-called pigtail joint in a simple and positive manner.

A feature of the invention is the provision of means for removing the pigtail joint from the index pin or finger about which it is placed during the twisting operation and for folding the joint into alignment with the wires of which the joint is a part, this means being capable of folding the joint in either direction depending upon the position of a member which is manually thrown prior to the twisting operation. This enables a better distribution of the pigtails or joints than if they were all folded one way.

Another feature is the provision of adjustable means for determining the number of twists and the pitch of the twists in a given twisting operation.

A further feature is the provision of a machine in which the moving parts are positively driven by cams on a motor driven shaft.

Still another feature is the provision of a lever supporting mechanism, whereby the machine may be moved in adjusted position with respect to the wires to be spliced in a simple and convenient manner.

More specifically, in this machine, the ends of the wires to be connected which normally extend in opposite directions are bent over an index pin or finger and brought in parallel relation on an adjustable anvil piece at the front end of the machine. The ends of these wires are placed between cooperating knife blades carried by a spindle for cutting the ends of the wires the proper length and simultaneously gripping them between wedging portions preparatory to the twisting operation. One of the blades is mounted on a sleeve member which is in turn capable of axial movement on the rotatable spindle under the action of a spring which is tensioned and released through the operation of a cam shaft. The spindle and the cam shaft are actuated by a motor through respective gear train mechanisms. The movement of the spindle is effective to twist the wires and means is provided for folding the joint in a left or right direction with respect to the general direction of the cable and disengaging the joint from the index member. However, the direction at which the joint is bent is dependent upon the position of a manually operated lever member placed at a convenient place on the machine. Means is provided for manually actuating sets of contact springs for starting the operation of the motor. The reversing of this motor for returning the spindle to normal and stopping it, is effected automatically through a mechanism controlled by the cam shaft. In this mechanism a plurality of means are provided for locking the spindle in its normal non-operated position upon the reverse movement of the motor and for locking the cam shaft in its non-operated position after each complete turn of this shaft. A one-way clutch device is provided for permitting the reverse movement of the motor while the cam shaft remains locked in its unoperated position.

Figures 1, 17:
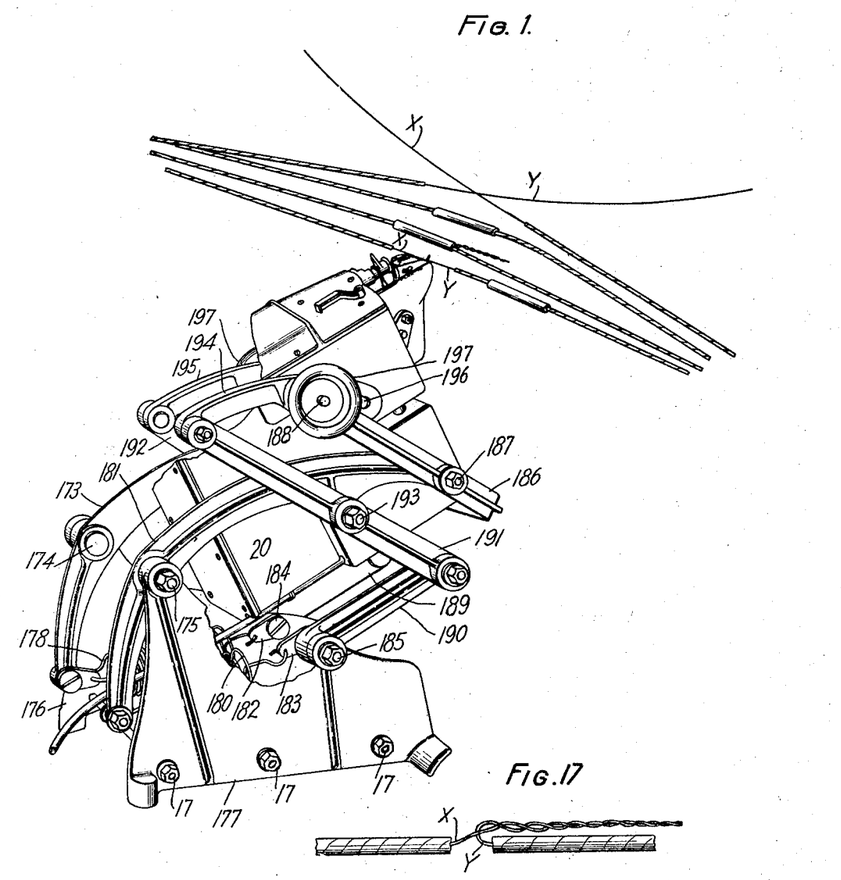
Fig. 1 is a perspective view of the machine showing a pair of wires in position on the twisting spindle.
Figs. 17 and 18 are views of connected wires showing the twisted portions of the wires folded in opposite directions.
Figure 2:
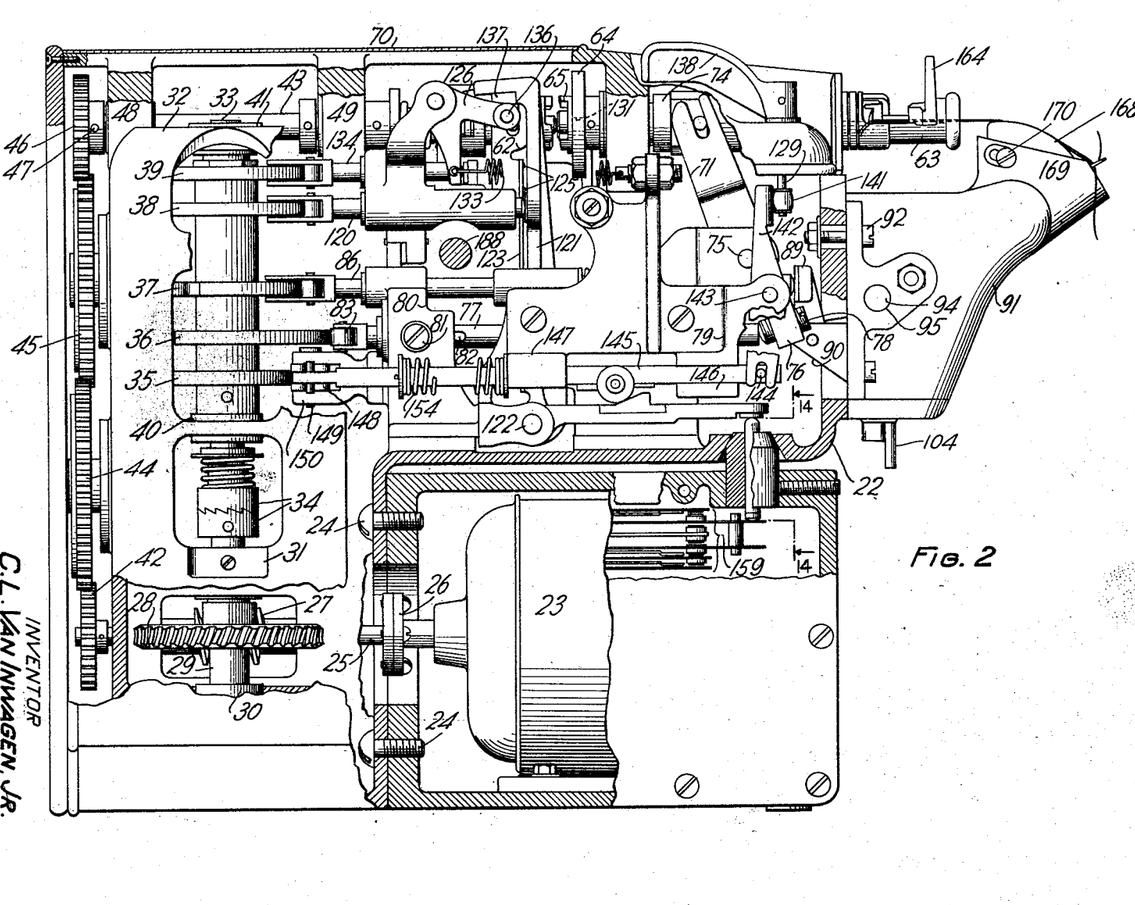
Fig. 2 is an assembly side view of the machine with the casing shown in section.
Figure 3:
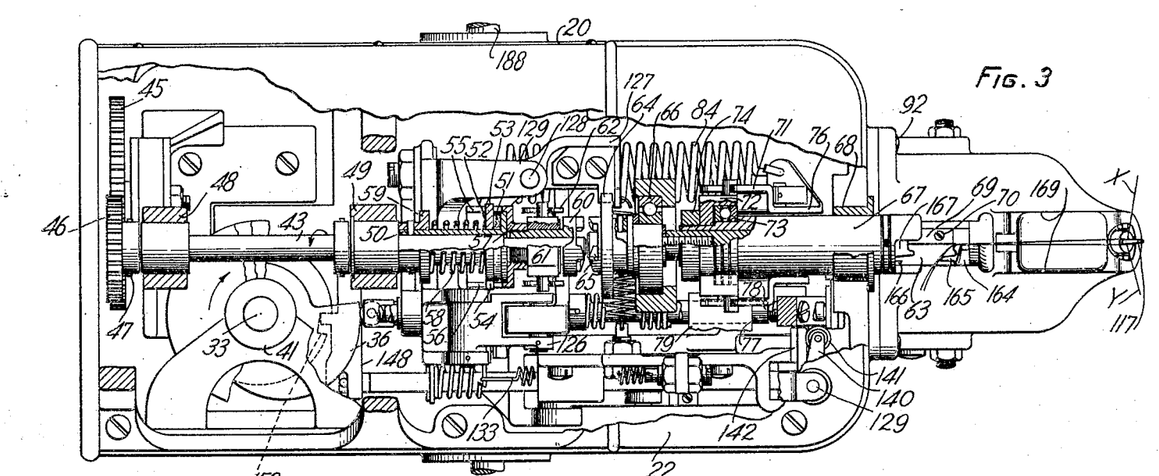
Fig. 3 is a top view of Fig. 2 with portions of the casing removed.

Referring to Figs. 1, 2 and 3 of the drawings 20 is a casing which encloses a frame structure 22 on which the operating parts of the machine are mounted.

On the lower front portion of the casing is mounted a motor 23 which is held in position thereon by a number of screws, such as 24 shown in Fig. 2. The armature shaft of the motor is operatively connected to a shaft 25 by an ordinary coupling device 26. On shaft 25 is mounted a worm 27 which engages a worm gear 28 securely mounted on a vertically disposed spindle 29 journaled in bearings 30 and 31 in the vertically disposed bracket portion 32. Spindle 29 is operatively connected to a coaxially disposed shaft 33 through a one way clutch device 34 provided to permit the reverse movement of shaft 29. On shaft 33 are mounted the notched disc 35 and the cams 36, 37, 38 and 39 provided for a purpose that will be hereinafter described in detail. The shaft 33 is journaled in bearings 40 and 41 in the bracket position 32.

On the other end of shaft 25 there is provided a pinion 42 for imparting movement to a shaft 43 through idle gears 44 and 45, the latter gear engaging a pinion 46 held securely on the shaft 43 by a pin 47.

Figure 5:
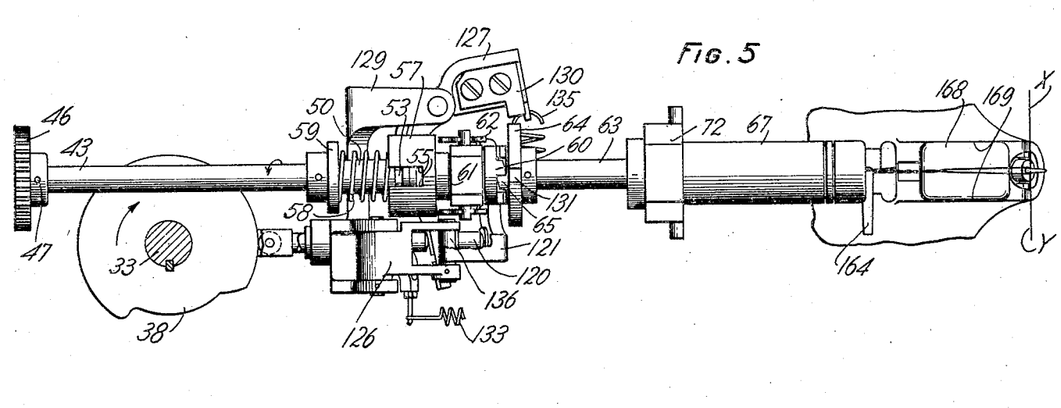
Fig. 5 is another view of the twisting spindle showing the clutch actuating mechanism.
Figures 14, 15, 16:
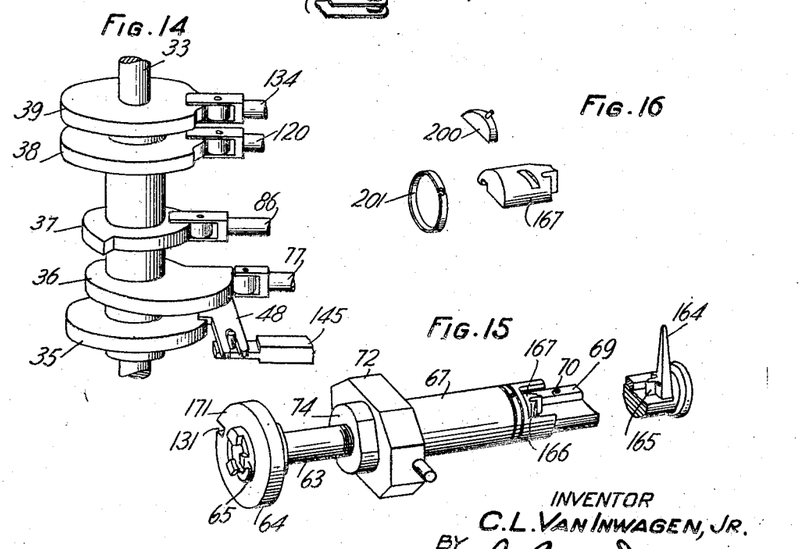
Fig. 14 is a partial view of the cam shaft showing the relative position of the cams.
Fig. 15 is a detailed view of the twisting spindle.
Fig. 16 is a detailed view of the method of securing the combined gripping and cutting member to the twisting spindle.
Figure 18:
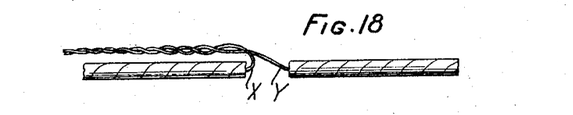

The shaft 43 is journaled in bearings 48 and 49 in the framework, as shown in Figs. 2, 3, and 5. On this shaft is mounted a friction clutch device which consists of a flanged sleeve 50, a friction washer 51 and a metal disc 52 having a pair of lugs 53 and 54 engaging the slots 55 and 56 in a bell-shaped member 57. A spring 58 having one end in abutment against the flange of collar 59 and the other end against the disc 52 frictionally drives the bell-shaped member 57. Member 57 is securely mounted on the hub portion of a toothed clutch element 60 which is in turn loosely mounted on the end of shaft 43. A collar 61 which engages a forked lever 62 is provided for operatively connecting the shaft 43 with a coaxially disposed spindle 63. This spindle carries at one end a disc 64 having a peripherally disposed tooth 171 and a notch 131 as shown in Fig. 15. This disc is formed integrally with a dog clutch element 65 arranged to be engaged by the clutch element 60 upon the movement of lever 121 and forked lever member 62 carried thereby in a manner that will be hereinafter described in detail.

The spindle 63 is mounted on a sleeve 67, in turn, slidably mounted in bushings 68 in the front end of the casing as shown in Fig. 3. The sleeve 67 is held against rotary movement on the spindle 63 by the flat portions of spindle 63 which register with the flat portions of wedging block 167. This block is locked to the sleeve 67 by a segment shaped key 200 which is held in place by a spring shown in detail in Fig. 16. A key 69 mounted on the spindle 63 guides the block 167 and the knife blade 166 carried thereby in registry with its associated blades 165 which are integrally formed with the key 69. This key is held securely on the spindle 63 by a number of screws such as 70. The sleeve 67 is moved axially on the spindle 63 by a forked lever 71 engaging a cup-shaped collar 72 which encloses a thrust bearing 73, the whole being held in adjusted position on the end of the sleeve 67 by a nut screw 74 as shown in Fig. 3.

Lever 71, is mounted on pivot 75 and is provided with a downwardly extending arm 76 having an adjustable screw 78 disposed in engageable relation with an actuating rod 77. This actuating rod is journaled at one end in lug 79 shown in Fig. 4 and at its other end in lug 80, the latter is provided with a screw 81 projecting into a longitudinally disposed groove 82 provided for holding this bar and the roller 83 carrier thereby in adjusted position with respect to the surface of cam 36, as shown in Figs. 2 and 3 wherein the rod 77 and the lever 71 actuated thereby are shown in the operated position.

A spring 84 has one end hooked on the lower end of the lever 71 and its other end is hooked to a tensioning screw 85. This spring is provided for automatically actuating the sleeve 67 upon the release of the rod 77 through the movement of cam 36 from the position shown in Fig. 3 to the position shown in Fig. 4 for a purpose that will be hereinafter described in detail.

On the outwardly extending end of spindle 63, there is mounted a guiding member 164 which is formed integrally with a knife blade 165 so formed as to cooperate with the knife blade 166 and the wedging block 167 for cutting and gripping the ends of the wires upon the movement of sleeve 67.

Mounted on the framework 22 in juxtaposition to the end of spindle 63 there is provided an anvil 168 and a mechanism for bending the twisted portion of the wires in line parallel to the length of the cable and for disengaging the wires after the completed operation. This mechanism comprises the cam 37 and the rod 86 which has a hollow enlarged end portion 87 arranged for receiving the end of a coaxially disposed bar 88. The other end of this bar is disposed in engageable relation with the upwardly extending arm of lever 89 which is pivotally mounted in lugs 90 of casing portion 91. This casing is adjustably mounted on the main frame structure 22 and is securely held thereon by a number of screws such as 92 shown in Figs. 2 and 3. The other end of lever 89 is connected to a duplex gear sector 192 by link 93. This sector is rotatably mounted on the shaft 94 in turn capable of axial movement in bearings 95 and 96 in the casing portion 91. On shaft 94 are mounted the gear sectors 97 and 98 which are held securely thereon by pins 99 and 100, respectively. These gear sectors and the shaft 94 are held against rotary movement by pins 101 and 102 against the action of a spring 103 which has one end secured to the duplex sector 192 and the other end on the gear sector 98. This spring is tensioned upon the movement of actuating bar 86 and is provided for returning the duplex gear sector 192 in the normal non-operated position after each splicing operation.

Figures 8, 9, 10, 11, 12:
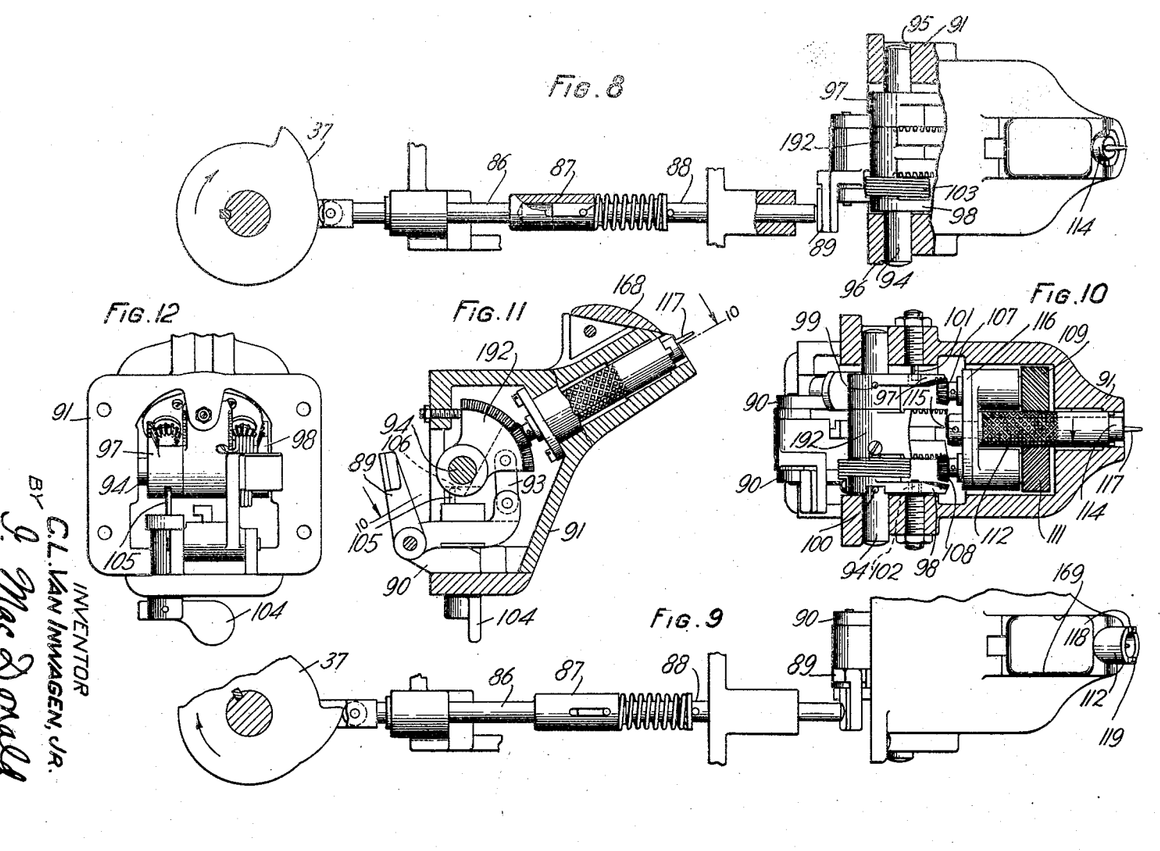
Figs. 8 to 12 are detailed views showing the operating mechanism for bending the twisted portion of the wires in line parallel to the cable.

The shaft 94 is moved in axial direction through the manual operation of lever 104 shown in Figs. 11 and 12 which controls the movement of eccentric pin 105 engaging a groove 106 in gear sector 97. The movement of lever 104 is effective to move the duplex gear sector 192 in engageable relation with pinions 107 and 108, depending upon the direction in which it is desired to fold the twisted portion of the wires. Pinion 107 is mounted on the spindle portion of helical gear 109 and pinion 108 on the spindle portion of helical gear 111. The gears 109 and 111 are each disposed in engageable relation with a similar gear toothed sleeve 112 which is loosely mounted on the spindle 114 securely supported at one end by bracket 116. The sleeve 112 is provided at its outwardly extending end with lugs 118 and 119 provided for bending the twisted portion of the wires in line parallel to the length of the wires in a right or left direction and to disengage the twisted wires from an index member 117 at the end of spindle 114 upon a two way movement of this sleeve, as will be hereinafter described in detail. The wires X, Y normally rest on an anvil 168 which is made adjustable with respect to the axis of the twisting spindle 63 for controlling the number of twists in the wires and the pitch of the twist.

Figures 6, 7:
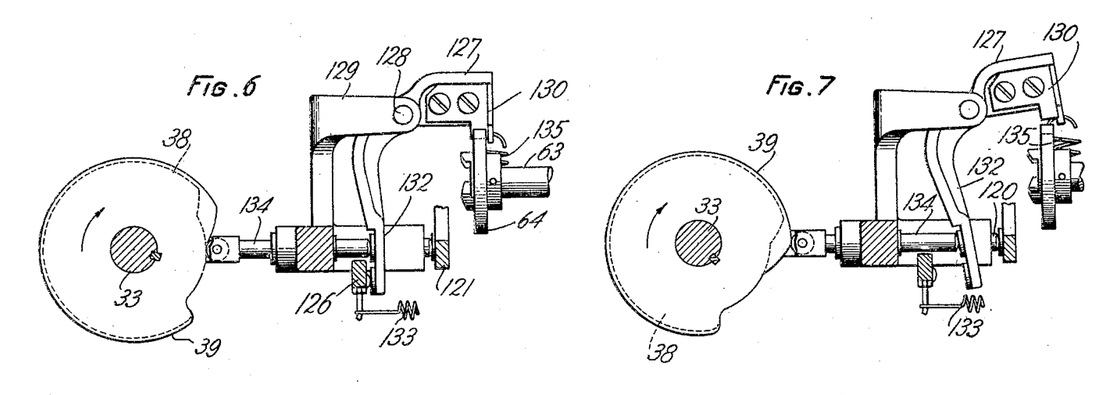
Fig. 6 is a detailed view showing the twisting spindle in its locked position.
Fig. 7 is another view of the spindle locking mechanism shown with the latch in the disengaged position.

The engagement of clutch element 60 with its associated clutch element 65 is effected through the movement of cam 38 which actuates the rod 120 in turn disposed in engageable relation with a lever 121. This lever is loosely mounted on shaft 122 and carries a leaf spring member 123 to which the forked member 62 is mounted and secured thereon by rivets 125. Lever 121 and the clutch element 60 actuated thereby are held in the operated position as shown in Fig. 5 by a latching lever 126 in turn, under control of lever member 127 and a retracting spring 133. Lever 127 is pivoted at 128 in bracket 129 and carries a latching piece 130 provided for engaging the notch 131 of disc 64 under the tension of spring 135. Lever 127 has an arm 132 as shown in Figs. 5, 6 and 7 engaging the downward extending arm of latching lever 126 and a coiled spring 133 is provided for automatically actuating lever 126 upon its release by lever 127. Lever 127 is actuated by a rod 134, in turn, movable under the operation of cam 39 for releasing the disc 64 and simultaneously tensioning the coiled spring 135 for automatically engaging the latching lever 127 with the notched disc 64 in a sequence of operation that will be hereinafter described in detail.

The starting mechanism for the motor 23 comprises the manually operable lever member 138 secured to one end of spindle 129. On the other end of this spindle is mounted a lever member 140 having a roller 141 disposed in engageable relation with the lever 142. This lever is loosely mounted on pivot 143 and has a downward extending forked portion engaging a pin 144 carried by a longitudinal movable bar 145. This bar is supported by guiding members 146 and 147 and is connected at the other end, to a lever 148 loosely mounted on pivot 149 in bracket 150. Lever 148 has a lug portion 151 provided for engaging the notch 152 in the disc 35 under the action of coiled spring 154 for locking the cam shaft 33 in its normal non-operated position after each complete turn of this cam shaft.

Figure 13:
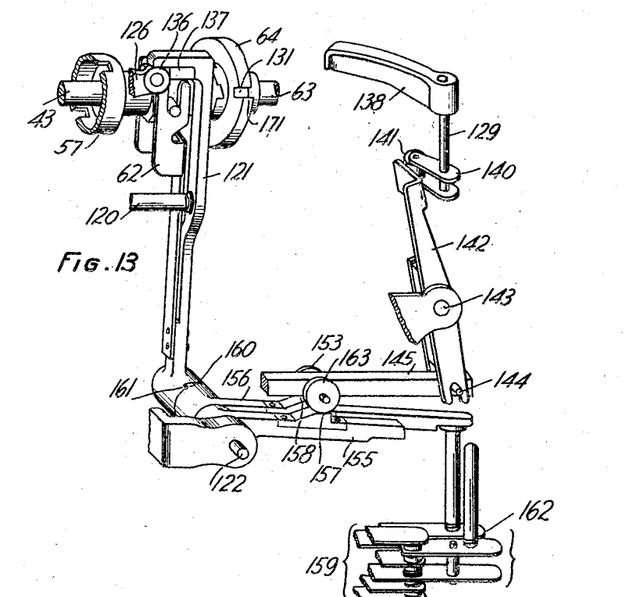
Fig. 13 is a detailed view of the mechanism for starting and stopping the action of the motor.

Bar 145 carries a pair of rollers 153, 163 which engage the cams 157 and 158 carried by lever arms 155 and 156, respectively. Lever 155 is provided for actuating a pile-up of contact spring 159 for controlling the movement of the motor in opposite directions. Lever arm 156 is provided for actuating a pile-up of contact springs 162 and is held in the operated position upon the release of bar 145 through its clutch portion 160 in engagement with the clutch portion 161 carried by lever member 121, as shown in Fig. 13. The set of contact springs 162 is provided for maintaining the battery supply in the motor operating circuit during the reverse switching operation of lever 155 which is effected upon the retracting movement of the bar 145. The reverse movement of the motor is effective to return the twisting spindle 63 in its normal non-operated position while the cam shaft 33 remains locked in its normal position by the locking lever 148.

Figure 4:
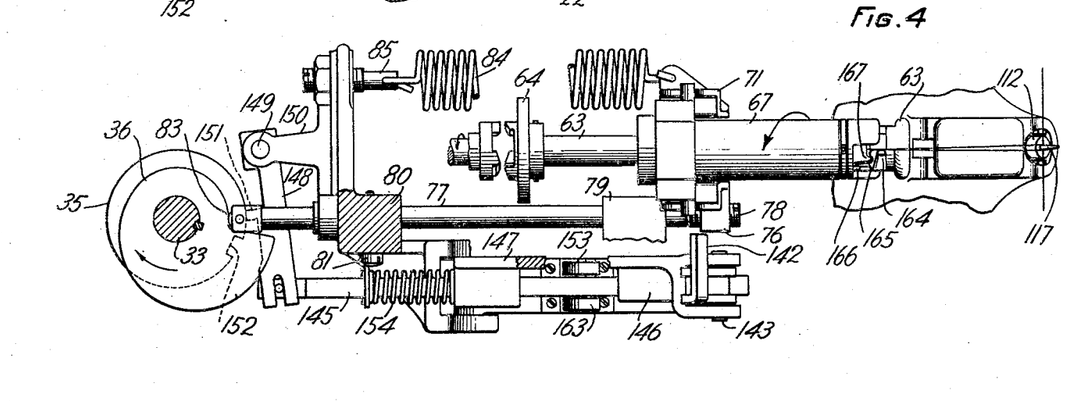
Fig. 4 is a detailed view of the twisting spindle showing the wire cutting and gripping actuating mechanism.

Considering the machine in its normal non-operated position as shown in Fig. 3 the two ends of the wires x, y to be connected are first placed in position on the machine where they are bent at right angles on the index pin 117. The extreme ends of these wires are guided substantially in parallel relation to each other and in alignment with respect to the longitudinal axis of the twisting spindle 63 by member 164 extending from the knife blade 165 carried by the spindle 63. The manual operation of lever member 138 and lever 140 carried thereby is effective to operate lever 142 for actuating the bar 145 against the resistance of coil spring 154 and thereby removing the latching lever 148 from the notch 152 in the disc 35. The movement of bar 145 and the rollers 153 and 163 is effective to close the operating circuit of the motor 23 through the operation of contact springs 159 and 162. The movement of motor 23 is imparted to the cam shaft 33 in the direction indicated by the arrow as shown in Figs. 3, 4, 5, 6 and 7 through the worm 27 and worm gear 28 and clutch 34. The movement of the motor is simultaneously transmitted to the shaft 43 in the direction indicated by the arrow in Figs. 3, 4 and 5 through the gears 42, 44, 45, and 46, but it is to be noted that the clutch elements 60 and 65 at the other end of this shaft are disconnected and the twisting spindle 63 does not revolve but is maintained in its normal non-operated position through the engagement of latching member 127 in the notch 131 of disc 64 as shown in Figs. 3 and 6. A small angular movement of shaft 33 and the cam 36 in the direction indicated by the arrow is effective to cause the release of rod 77 and the operation of sleeve 67 under the action of spring 84 from the position shown in Fig. 3 to the position shown in Fig. 4, wherein the ends of the wires are cut at equal length through the engagement of the knife blades 165 and 166 and are simultaneously clamped through the gripping portion of block 167 and the knife blade 165, as shown in Fig. 4. The bar 145 and the contact spring 159 and 162 are now held in the operated position by the latch 151 riding on the periphery of disc 35.

The continued movement of cam shaft 33 through an angular distance of substantially 60° is effective to cause the disengagement of latching lever 127 from the disc 64 through the operation of bar 134 by the cam 39 against the resistance of coil spring 135. The movement of latching lever 127 releases the lever 126 which moves in contact with the undersurface of a block 137 of lever 121 through the tension of spring 133. By a further movement of cam shaft 33 and the cam 38 carried thereby, lever 121 is moved in the position indicated in Fig. 13 wherein the roller 136 carried by lever 126 engages the front portion of block 137 and holds this lever in the actuated position. The movement of lever 121 from the position shown in Fig. 2 to the position shown in Figs. 5 and 13 is effective to cause the engagement of clutch element 60 for actuating the spindle 63 and twisting the wires together a number of turns after which the twisted wires are broken at the end of the spindle 63 due to the fatiguing of the wires at the finest pitch of the twist. The number of turns at which the twisted portions of the wires generally breaks is controlled by the position of the anvil 168 with respect to the clamping point of the wires. This adjustment is conveniently made either by switching the anvil in the guide 169 where it may be securely held in adjusted position by a screw 170 as shown in Figs. 2 and 3 or by the adjustment of casing portion 91 with respect to spindle 63.

Upon the continued movement of cam shaft 33 cam 37 actuates the rod 88 through its resilient connection 87 with the rod 86. The end of rod 88 engages the lever 89 and actuates the duplex gear sector 192 through its link connection 93. The movement of this gear sector rotates pinion 108 and the helical gear 111, in turn, imparting a rotating movement to the sleeve 112 in the direction indicated by the arrow as shown in Fig. 10. Pinion 107 and the helical gear 109 are held against movement by the gear sector or stop 97 and due to the engagement of helical gear 109 with the sleeve 112 causes this sleeve to move in an axial direction. The two-way movement of this sleeve beyond the end of spindle 114 is effective to engage the twisted portion of the wires for bending it in line parallel with the general direction of the cable and to disengage the twisted portion from the index member 117. The spring 113 is provided for returning the sleeve 112 and the duplex gear sector 192 to its normal position against an adjustable screw as shown in Fig. 11 thus restoring the sleeve 112 to normal. Similarly the engagement of duplex gear sector 192 with pinion 107 and the locking of pinion 108 by sector 98 is effective to reverse the rotations of sleeve 112 in the manner above described for folding the twisted portions of the wires in the opposite direction to that referred to above.

During the continued movement of cam shaft 33 to its normal position, as shown in Fig. 3 the cam 36 is effective to tension the spring 84 through the movement of bar 77 which controls the operation of lever 71. The movement of cam shaft 33 is also effective to position the cams 38 and 39 wherein the levers 121 and 127 are simultaneously released. Owing to the camming action of disc 64 against the lever 127 and due to the relatively high speed of the twisting spindle in its forward direction, lever 127 remains in the operated position against the periphery of the disc 64 which prevents the tripping of the latching lever 126 from lever 121 and thus holding this lever and the toothed clutch element 60 carried thereby in the operated position. Upon a complete turn of cam shaft 33, the lever 148 reengages the notch 152 of disc 35 through the movement of the bar 145 under the action of retracting spring 154. The return movement of bar 145 to normal is effective to release the contact spring actuating lever 155 which is returned to normal through the action of springs 159 which are normally tensioned in an upward direction. Lever 156 which controls the current supply in the operating circuit of the motor remains in the operated position through its clutch engagement with lever 121 in turn held locked in the operated position by latching lever 126. The release of lever arm 155 is effective to reverse the current flow in the armature of the motor and thus cause the reversing movement of the twisting spindle 63. Upon the reverse movement of this spindle, the tooth 171 at the periphery of the disc 64 engages the latching portion 130 of lever 127 and stops the movement of the spindle, thus permitting the latch to fall in the bottom of the notch 131 as shown in Fig. 6. The friction clutch which connects the shaft 43 to clutch element 60 permits the continued movement of this shaft due to the inertia of the motor armature and the engagement of lever 127 with the notch 131 in the disc 64 is effective to unlatch lever 121 through the engagement of arm 132 with lever 126 and thus permits the return movement of lever 121 to normal and the disengagement of clutch element 60 from clutch element 65. The movement of lever 121 is effective to release the arm 156 which is returned to the non-operated position through the resiliency of contact springs 162, and the machine is thus restored to normal for subsequent operations.

As shown in Fig. 1 the casing 20 is adjustably mounted on a system of levers which comprises the double armed arcuated levers 173 and 181, pivoted at 174 and 175 on upright supports 176 and 177 respectively. These levers have each, one end hooked to a spring 178 and 180 and the other ends of these springs are hooked to link members 182 and 183 mounted on pivots 184 and 185. The other ends of levers 173 and 181 are pivoted to the lower portion of a U-shaped yoke 186 by pivots such as 187 and the upper ends of yoke 186 engage a stud 188 extending across the machine as shown in Fig. 3. On pivots 184 and 185 are mounted the lever arms 189 and 190 and the other ends of these arms are pivotally mounted on the double armed levers 191 and 192. These levers in turn are pivoted on studs such as 193 on the arcuated levers 173 and 181 and the upper ends of levers 191 and 192 are pivotally connected to levers 194 and 195. The ends of levers 194 and 195 have each an arcuated slot such as 196 for adjustment on the stud 188 and a pair of hand wheels 197 which threadedly engage the ends of stud 188 are provided for securing the machine in adjusted position. The springs 178 and 180 are provided for supporting the machine while it is being moved to its adjusted position with respect to the wires $x$ and $y$, to be connected together.

Figure 19:
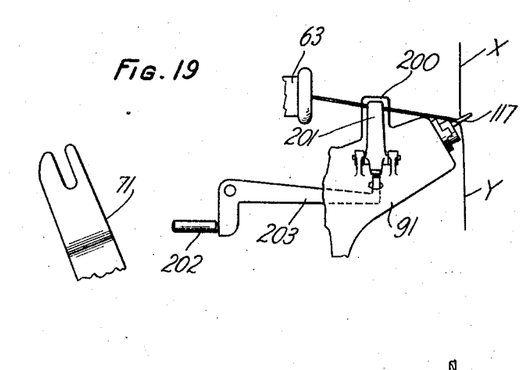
Fig. 19 is a view of a modification showing a clamping device used for controlling the twist of the wires.

In Fig. 19 the wires $x-y$ are placed between the stationary jaw 200 and movable jaw 201 of a clamping device placed in position intermediate the pin 117 and the end of spring 63. The movable jaw 200 is pivotally mounted on the casing portion 91 and is actuated by lever 71 (Figs. 2, 3 and 4) through a rod 202 and lever 203 in turn engaging the movable jaw 201, the pressure to which the wires are submitted by the operation of the member 201 being effective to control the character or pitch of the twist in the wires.

Figure 20:
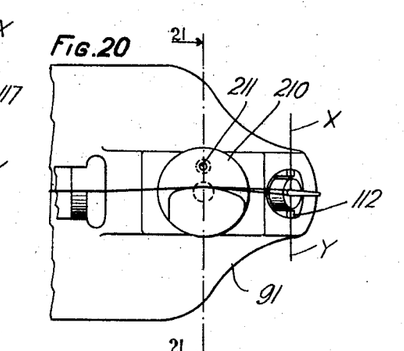
Fig. 20 is a modification of the anvil shown in Figs. 8, 9, 10 and 11.
Figure 21:
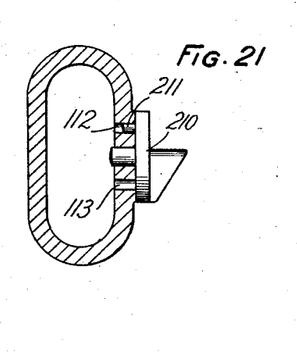
Fig. 21 is a side view of the anvil shown in Fig. 20.

In the modification shown in Fig. 20 the anvil 210 is mounted on the casing portion 91 and extends in an upward direction on the side of wires $x, y$. A pin 211 which registers with the holes 212 and 213 shown in Fig. 21 is provided for holding this anvil against rotary movement on the right and left side of the wires, 180° from the position shown depending upon the direction to which the sleeve 112 is operated, the operation of the sleeve being as above described under control of the manually operable lever 104. In this device the frictional resistance of the pigtail on the anvil after the pigtail is formed is entirely eliminated and the twisted portion is thereby free to be folded by the movement of sleeve 112.

Figure 22:
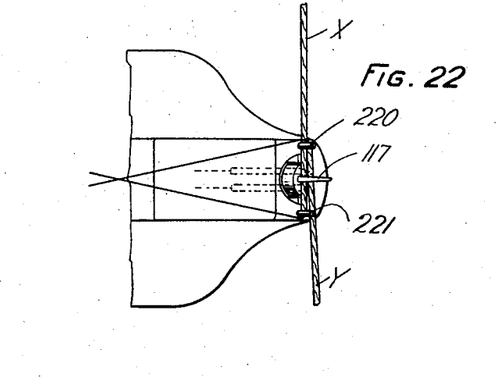
Fig. 22 is a view of a device used for stripping the insulation from the wires preparatory to the twisting operation showing the position of the wires after the stripping operation.

In Fig. 22 the wires $x, y$ are first placed over the pins 220 and 221 over which the insulation is stripped from the wires at equal length. The wires are then disengaged from their respective pins and brought in place on the pin 117 for twisting this wire in the manner above described, but it is to be noted that a certain length of insulation which is equal to the distance between the pins 117 and 220 on one side and the pins 117 to 221 on the other side is left to be twisted with the wires as shown by the dotted lines in Fig. 22. The twisting of a small length of insulation with the wires prevents the insulation from sliding and uncovering the wires beyond the ends of the insulating sleeve, when the sleeve is placed over the connection and thus prevent short-circuiting the conductors.

From the foregoing description, it will be seen that this invention provides a machine which will produce a pigtail joint having several loose turns at the neck and several tightly twisted turns, which is very desirable since these loose turns permit of a certain amount of stretching without affecting the connection at the tightly twisted end of the pigtail splice. This is very valuable if for any reason an old cable splice is opened and also gives better insurance against defective joints developing during the ordinary handling of the splice in the making. It will be noted that this is accomplished by interposing an anvil between the pin or index member and the end of the spindle in such a way as to deflect the pigtail from a straight line during the twisting operation. The number of loose turns and the rate of change of pitch along the length of the joint would of course depend upon the shape and position of the anvil.

Conditions in the telephone plant frequently make it necessary to keep the length of a splice in 1200 pair cable down to 17". Since the practice is to stagger the joints in three rows which do not overlap, there is not sufficient room between the necks of the joints on the end rows and the cut end of the cable sheath to place the cotton insulating sleeve, prior to twisting the joint. It is necessary, therefore, to place this sleeve on the wire coming from the opposite end of the splice. If the machine folds the completed joint toward the left only, this makes it necessary for the operator to slide the sleeve over the completed joint on the right-hand row against the free end of the pigtail, and this appreciably increases the time required to complete a joint.

The present hand-splicing practice on the end rows of joints is to place the neck of the joint as near to the center row as possible without causing the cotton sleeves to overlap, and fold the pigtail toward the cable sheath at the nearest end. This not only facilitates sliding the sleeves over the completed joint, but in addition provides for the maximum possible length of free wire issuing from the cable sheath on the near end of the splice. If the machine is arranged to fold the pigtail in either direction, the same result can be obtained. This will mean an increase in length of approximately 1½" in this wire, and while this increase is small, nevertheless, it is very important when an old splice is opened for repairs or making changes.

What is claimed is:

1. In a wire splicing machine, the combination with means for twisting the wires together and means for operating said twisting means, of means for automatically bending the completed joint into alignment with the untwisted portion of the wires, and a device adapted to control said latter means to cause the same to bend the joint in either direction.

2. In a wire splicing machine, the combination with means for twisting the wires together, means for operating said twisting means, of a plurality of selectively actuated means for automatically folding the completed joint in either direction, and manually operated means for controlling the operation of said selective means.

3. In a wire splicing machine, the combination with means for twisting the wires together, means for operating the same, of selectively actuated mechanisms for folding the completed joint in either direction, manually operated means for controlling said mechanism, and automatically operable means for returning the selected mechanism to normal after each wire twisting operation.

4. In a splicing machine, the combination with means for twisting the wires together, and means for operating the same, of adjustable means for controlling the number of twists and the pitch of the completed joint.

5. In a splicing machine, the combination with means for twisting the wires together, means for operating the same, means for holding the wire during the movement of the first mentioned means, of an adjustable anvil placed in position intermediate said twisting means and said means for holding the wires for controlling the number and the pitch of the twists.

6. In a splicing machine, a motor, a shaft actuated by said motor, a twisting spindle, normally disengaged clutching devices for operatively connecting said shaft to said spindle, a cam shaft operated by said motor and yieldable means tensioned by the operation of said cam shaft for operatively engaging said clutching devices.

7. In a splicing machine, a motor, a shaft, a twisting spindle actuated by said motor, cooperating shear members carried by said spindle, normally disengaged clutching devices for operatively connecting said shaft to said spindle, a cam shaft actuated by said motor, means controlled by said cam shaft for actuating one of said shear members and yieldable means tensioned by the operation of said cam shaft for operatively engaging said clutching device.

8. In a wire splicing machine, a motor, a counter shaft and a cam shaft actuated by said motor, a spindle, a sleeve carried by said spindle, cooperating wire cutting and gripping means carried by said spindle and said sleeve, normally ineffective clutch devices for operatively connecting said spindle to said counter shaft, a spring tensioned by the movement of said cam shaft for actuating said sleeve for cutting and gripping the wires, and yieldable means tensioned by the movement of said cam shaft to render said devices effective for actuating said spindle for twisting the wires.

9. In a wire splicing machine, a motor, a cam shaft actuated by said motor, a twisting spindle, normally ineffective clutch devices for operatively connecting said motor to said spindle, means operable under control of said cam shaft to render said devices effective for twisting the wires, means operable automatically for holding said devices in the operated position independently of the first mentioned means for a predetermined movement of said cam shaft means for reversing the movement of said spindle and other means actuated by said cam shaft for actuating the second mentioned means for releasing said devices for stopping the movement of said spindle.

10. In a wire splicing machine, a motor, a counter shaft and a cam shaft actuated by said motor, a spindle adapted to be connected to said counter shaft having a knife blade, an axially movable sleeve mounted on said spindle having a knife blade cooperating with the first mentioned blade, a spring tensioned by the movement of said cam shaft for actuating said sleeeve for cutting the ends of the wires and other means actuated by said cam shaft for causing the operation of said spindle for twisting the wires.

11. In a wire splicing machine, a motor, a cam shaft actuated by said motor, a normally effective latching device for said shaft, a spindle, normally ineffective means for operatively connecting said spindle to said motor, a sleeve capable of axial movement on said spindle, cooperating wire cutting and gripping means carried by said spindle and said sleeve, a spring tensioned by the movement of said cam shaft for actuating said sleeve, other means actuated by said cam shaft for actuating the first mentioned means for operatively connecting said spindle to said motor for twisting the wires and manually operable means for unlatching said cam shaft and simultaneously starting the operation of said motor.

12. In a wire splicing machine, a twisting spindle, an anvil disposed adjacent said spindle for positioning the wires, an index member for holding the wires in position on said anvil, said anvil being adjustable with respect to said spindle for controlling the number of twists in the splice, means for disengaging the wires from said index after the twisting operation of said spindle, and a motor for actuating said spindle and said means.

13. In a wire splicing machine, a twisting spindle, means carried by said spindle for gripping the ends of the wires, an index member for holding the wires in alignment with the rotating axis of said spindle, means operable for folding the twisted joint in one direction and simultaneously disengaging the joint from said member, and manually operable means for controlling the movement of the second mentioned means for folding the joint in another direction.

14. In a wire splicing machine, a motor, a twisting spindle actuated by said motor, an index member disposed in juxtaposition to said spindle for holding the wires, a mechanism for folding the twisted portion of the wires, said mechanism including a gear toothed sleeve mounted on said member, a plurality of gears engaging said sleeve, a pair of spindles for said gears, a pinion mounted on each of said spindles, a duplex gear sector, latching devices for engagement with said pinions, manually operable means for engaging said gear sector with one of said pinions and engaging one of the latching devices with the other pinion, and mean operable under the action of said motor for actuating said sector for imparting movements to said sleeve for folding and disengaging the wires from said member.

15. In a wire splicing machine, a motor, a counter shaft and a cam shaft actuated by said motor, a spindle, a sleeve capable of axial movement on said spindle, normally ineffective wire cutting and gripping means carried by said spindle and said sleeve, a spring tensioned by the movement of said cam shaft for actuating said sleeve to render said means effective, a clutch device for operatively connecting said spindle to said counter shaft for twisting the wires, manually operable means for starting the motor, means actuated by said cam shaft for holding the first mentioned means operated a predetermined number of turns of said spindle, switching means operable upon a predetermined movement of said cam shaft for reversing the operation of said spindle, and automatically operable means for arresting the movement of said spindle in the reverse direction, said automatic means being effective to cause a change in said switching means for stopping the operation of said motor upon the return of the spindle to normal.

16. In a wire splicing machine, a counter shaft, a spindle, combined wire cutting and gripping elements carried thereby, a latching member for normally holding said spindle in the non-operated position, means operable for unlatching said spindle, a normally ineffective clutch device, an index member disposed in juxtaposition to the end of said spindle for holding the wires, means for actuating the wire cutting and gripping elements, means for actuating said clutch device for rotating said spindle for twisting the wires, means for locking said clutch device in the operated position after the twisting operation and preparatory to reversing the movement of said spindle, means for retracting the wire cutting and gripping means to normal, means for folding the twisted joint and disengaging the joint from said index member, means operable for reversing the movement of said spindle, another device operable under control of the first mentioned means for releasing said clutch device and reengaging said latching member with said spindle, a cam shaft for controlling the operation of each of said means and a motor for actuating said counter shaft and said cam shaft.

17. The combination with a wire splicing machine having a casing, of a stud extending across said casing, a base, a plurality of levers mounted on said base and interconnecting with said stud, the stud permitting the pivotal movement of the casing on said levers, and the movement of the levers on the base permitting the forward adjustment of the casing, and fastening means for securing said levers to said casing for holding it in adjusted position with respect to the wires to be spliced.

18. The combination with a wire splicing machine having a casing, of a lever supporting mechanism for the casing, said mechanism comprising a pair of upright supports, a pair of arcuated levers pivoted on said supports, a yoke pivoted on the front ends of said levers and engaging a pivot crossing through the casing, a pair of arms pivoted on said supports, a pair of double armed levers each pivoted at one end to one of said arms and on their middle portions to said arcuated levers, a pair of arcuated arms carried by the double armed levers having slots engaging said stud, and means carried by said stud for securing said yoke along the slots in said arcuated arms for holding the casing in adjusted position with respect to the wires to be spliced.

19. The combination with a wire splicing machine having a casing, of a lever supporting mechanism for said casing, said mechanism comprising a pair of upright supports, a pair of arcuated double armed levers pivoted on said supports, a yoke pivoted on similar ends of said double armed levers, a stud protruding through the casing engaged by said yoke, lever arms each pivoted at one end on said uprights, levers pivoted on their middle portions on the double armed levers and at their lower ends to said lever arms, adjustable means carried on the other ends of the last mentioned levers engaging said stud, means for securing said adjustable means to said yoke and to the casing for securing the same in adjusted position, and spring means hooked to the other end of said arcuated levers and to the uprights for supporting said casing in an elevated position during the adjustment thereof.

20. In a wire splicing machine a twisting head for gripping and twisting a pair of wires and an anvil associated with said twisting head for causing the same to twist the ends of the wires with a variable pitch in a single continuous operation of said twisting head.

In witness whereof, I hereunto subscribe my name this 12th day of April, 1930.
CHARLES L. VAN INWAGEN, Jr.